United States Patent [19]

Lockhart

[11] Patent Number: 4,499,230

[45] Date of Patent: Feb. 12, 1985

[54] ONE PACKAGE, STABLE, MOISTURE CURABLE, ALKOXY-TERMINATED ORGANOPOLYSILOXANE COMPOSITIONS CONTAINING A ZEOLITE

[75] Inventor: Thomas P. Lockhart, Schenectady, N.Y.

[73] Assignee: General Electric Company, Schenectady, N.Y.

[21] Appl. No.: 481,529

[22] Filed: Apr. 1, 1983

[51] Int. Cl.$^3$ .................. C08K 3/34; C08G 77/04; C08G 77/06; C08G 77/20

[52] U.S. Cl. .................. 524/450; 524/588; 528/18; 528/19; 528/32; 528/34; 528/901

[58] Field of Search .................. 524/450, 588; 528/18, 528/19, 32, 34, 901

[56] References Cited

U.S. PATENT DOCUMENTS

| 2,607,792 | 8/1952 | Warrick . | |
|---|---|---|---|
| 3,035,016 | 5/1962 | Bruner . | |
| 3,054,769 | 9/1962 | Pike | 524/450 |
| 3,065,194 | 11/1962 | Nitzsche et al. . | |
| 3,070,559 | 12/1962 | Nitzsche et al. . | |
| 3,122,522 | 2/1964 | Brown et al. . | |
| 3,127,363 | 3/1964 | Nitzsche et al. . | |
| 3,133,891 | 5/1964 | Ceyzeriat . | |
| 3,153,007 | 10/1964 | Boot . | |
| 3,161,614 | 12/1964 | Brown . | |
| 3,184,427 | 5/1965 | Russell et al. . | |
| 3,236,806 | 2/1966 | Dunham | 524/450 |
| 3,240,731 | 3/1966 | Nitzsche et al. . | |
| 3,296,161 | 1/1967 | Kulpa . | |
| 3,296,195 | 1/1967 | Goossens . | |
| 3,334,067 | 8/1967 | Weyenberg . | |
| 3,438,930 | 4/1969 | Beers . | |
| 3,518,286 | 6/1970 | Pande et al. . | |
| 3,542,901 | 11/1970 | Cooper et al. . | |
| 3,632,557 | 6/1972 | Brode et al. . | |
| 3,647,917 | 3/1972 | Schulz et al. . | |
| 3,677,996 | 7/1972 | Kaiser et al. . | |
| 3,689,454 | 9/1972 | Smith et al. . | |
| 3,779,986 | 12/1973 | Smith et al. . | |
| 3,819,563 | 6/1974 | Takago et al. . | |
| 3,886,118 | 5/1975 | Nitzsche et al. . | |
| 4,180,642 | 12/1979 | Takago . | |
| 4,220,567 | 9/1980 | Kindervater et al. | 524/450 |
| 4,223,122 | 9/1980 | Cella . | |
| 4,248,993 | 2/1981 | Takago . | |
| 4,250,081 | 2/1981 | Bode et al. | 524/450 |
| 4,257,932 | 3/1981 | Beers . | |
| 4,257,957 | 3/1981 | Cella . | |
| 4,294,975 | 10/1981 | Takago . | |
| 4,301,269 | 11/1981 | Hashimoto et al. . | |
| 4,302,571 | 11/1981 | Arai et al. . | |
| 4,304,920 | 12/1981 | Arai et al. . | |
| 4,307,010 | 12/1981 | Sandler et al. | 524/450 |
| 4,323,488 | 4/1982 | Takago et al. . | |
| 4,339,563 | 7/1982 | Takago et al. | 528/19 |
| 4,371,656 | 2/1983 | Kashiwase et al. | 524/450 |
| 4,376,192 | 3/1983 | Takago et al. | 528/19 |
| 4,395,507 | 7/1983 | Dziarek et al. | 528/34 |
| 4,395,526 | 7/1983 | White et al. | 528/19 |

FOREIGN PATENT DOCUMENTS 2640328  8/1976  Fed. Rep. of Germany .

OTHER PUBLICATIONS

Derwent Abst. 31403 D/18 Nippon Sheet Glass J56024568 (3–1981).
Derwent Abstract 54492 C/31 Showa Elect J55081377.
Derwent Abstract 20396 Y/12 Shinetsu DT 2640328 (3–1977).
Derwent Abst. 52070 C/30 Showa Elect J55075447 (6–1980).
Derwent Abst. 08778 T-AJ FR2079460 Nov. 1971.
Reagents for Organic Synthesis, Fieser et al., J. Wiley, NY, 1967, pp. 703–705, vol. 1.
Advanced Organic Chemistry, 2nd Ed., J. March, McGraw-Hill, 1977, pp. 1184, 923–925, 936–937 & 940.
Chemistry & Technology of Silicones, W. Noll, Academic Press, 1968, pp. 99–100.
Chemistry and Technology of Silicones, W. Noll, Academic Press, New York, 1968, p. 397.
Encyclopedia of Chemical Technology, Kirk-Othmer, 3rd Ed., vol. 13, John Wiley & Sons, New York, pp. 874–893.

Primary Examiner—Herbert J. Lilling
Attorney, Agent, or Firm—William A. Teoli; James C. Davis, Jr.; James Magee, Jr.

[57] ABSTRACT

Stable, substantially acid-free, one package moisture curable alkoxy-terminated organopolysiloxane compositions are provided having a condensation catalyst and a stabilizer or scavenger for materials having chemically combined hydroxy radicals in the form of a molecular sieve.

8 Claims, No Drawings

ONE PACKAGE, STABLE, MOISTURE CURABLE, ALKOXY-TERMINATED ORGANOPOLYSILOXANE COMPOSITIONS CONTAINING A ZEOLITE

CROSS REFERENCE TO RELATED APPLICATIONS

Reference is made to copending application of John E. Hallgren, Ser. No. 277,525 now U.S. Pat. No. 4,377,706, for Polyalkoxysilylenolethers and method for making, White et al, Ser. No. 277,524 now U.S. Pat. No. 4,395,526, for One Package, Stable, Moisture Curable, Polyalkoxy-Terminated Organopolysiloxane Compositions and Method for Making, filed concurrently on June 26, 1981, and John J. Dziark, for scavengers for One Component Alkoxy Functional RTV Compositions and Process, Ser. No. 349,695 now U.S. Pat. No. 4,417,042, filed Feb. 17, 1982. Reference is also made to the copending application of Mary Ann White et al, Ser. No. 481,527, filed Apr. 1, 1983, and my copending applications Ser. No. 481,528, filed Apr. 1, 1983, now U.S. Pat. No. 4,477,625 and Ser. No. 481,530, filed Apr. 1, 1983, now U.S. Pat. No. 4,467,063, for One Package, Stable, Moisture Curable, Alkoxy-Terminated Organopolysiloxane Compositions, and Ser. No. 481,526, filed Apr. 1, 1983 now U.S. Pat. No. 4,472,564, for A Method for Making an Enoxy Stabilized Room Temperature Vulcanizable Organopolysiloxane Composition Which Resists Color Change Upon Aging, where all of these applications are filed concurrently herewith, assigned to the same assignee as the present invention and incorporated herein by reference.

BACKGROUND OF THE INVENTION

Prior to the present invention, various one and two-package moisture curable room temperature vulcanizable (RTV) compositions were available based on the use of a silanol-terminated polydiorganosiloxane having the formula,

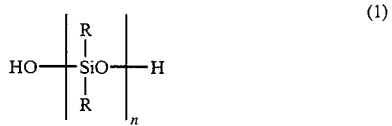

(1)

where R is a $C_{(1-13)}$ monovalent substituted or unsubstituted hydrocarbon radical, which is preferably methyl, or a mixture of a major amount of methyl and a minor amount of phenyl, cyanoethyl, trifluoropropyl, vinyl, and mixtures thereof and n is an integer having a value of from about 50 to about 2500, with a cross-linking silane having hydrolyzable radicals attached to silicon Ceyzeriat, U.S. Pat. No. 3,133,891 and Bruner, U.S. Pat. No. 3,035,016, are based on the use of methyltriacetoxysilane with a silanol-terminated polydimethylsiloxane under substantially anhydrous conditions. Although the one-package compositions of Bruner or Ceyzeriat, upon exposure to atmospheric moisture, provide satisfactory one-package room temperature vulcanizable organopolysiloxane compositions exhibiting satisfactory tack-free time, for example, 30 minutes or less after an extended shelf period, the acetic acid by-product is corrosive and has a disagreeable odor.

Other variations of one-package acyloxy acid generating RTV's are shown by Kulpa, U.S. Pat. No. 3,296,161, Goossens, U.S. Pat. No. 3,296,195 and Beers, U.S. Pat. No. 3,438,930, assigned to the same assignee as the present invention. Additional one-package acyloxy acid generating RTV compositions are shown by Schulz et al, U.S. Pat. No. 3,647,917 and Nitzsche et al U.S. Pat. No. 3,886,118.

An improved, low odor, substantially non-corrosive one-package RTV composition is shown by Beers, U.S. Pat. No. 4,257,932, assigned to the same assignee as the present invention. Beers achieves a reduction in odor and corrosive properties by utilizing as a crosslinking silane, a less volatile material such as methyltris-(2-ethylhexanoxy)silane.

A non-corrosive two package moisture curable organopolysiloxane composition free of carboxylic acid generating groups is shown by Nitzsche et al, U.S. Pat. No. 3,127,363 which is based on the use of a polyalkoxysilane, or polysilicate cross linking agent, in place of methyltriacetoxysilane. The ingredients of the two package non-corrosive composition of Nitzsche et al, are mixed under atmospheric conditions and the resulting composition must be used soon after the ingredients are mixed because the resulting blend has a short shelf life. Although the mixture of Nitzsche et al, which is typically polyalkoxysilane, silanol-terminated polydiorganosiloxane and tin soap catalyst, provides upon mixing, a fast curing non-corrosive room temperature vulcanizable composition, the Nitzsche et al mixture does not have the extended shelf life advantage of the one package system which is required for various commercial uses and therefore is excluded from a variety of applications.

Nitzsche et al, U.S. Pat. No. 3,065,194, teaches that a mixture of an endblocked dimethylsiloxane polymer, such as hydroxy and alkoxy endblocked, inert filler, ethylorthosilicate and dibutyltindilaurate can be vulcanized upon contact with water, after a 14 day shelf period at room temperature. However, the various ingredients of the mixture have to be vigorously dried by heating for 1 hour at 200° C., and the RTV, after a relatively short shelf period, has to be drenched with water.

Improved results toward combining the advantages of a non-corrosive acid-free polyalkoxysilane cross-linking agent with a silanol-terminated polydiorganosiloxane as a one-package system are shown by Weyenberg, U.S. Pat. No. 3,334,067, Cooper et al, U.S. Pat. No. 3,542,901 and by Smith et al U.S. Pat. Nos. 3,689,454, and 3,779,986, the last two being assigned to the same assignee as the present invention, utilizing a titanium chelate catalyst in place of a tin catalyst. However, after room temperature vulcanizable one-package systems based on a titanium chelate catalyst were allowed to age for a period of 5 hours or more, it was found that the tack-free time of the aged RTV was considerably longer than the tack-free time of the same mixture after it was initially mixed and immediately exposed to atmospheric moisture.

As shown by Brown et al U.S. Pat. No. 3,122,522, a platinum catalyst is used to prepare an alkoxy terminated silalkylenepolysiloxane polymer. However, this method of synthesizing the base polymer requires an expensive hydrosilylation procedure. Additional efforts to achieve a desirable non-corrosive, substantially odor-free stable one-package RTV based on the use of polyalkoxy organopolysiloxane in a more economic manner are shown by Brown et al, U.S. Pat. No. 3,161,614 or U.S. Pat. No. RE-29760 Brown et al employed a polyalkoxy end blocked polysiloxane which was based on the use of a mineral acid generating polyalkoxyhalosilane, and a curing catalyst However, these compositions were found to be unusable because they failed to cure in contact with a tin catalyst, even in the presence of moisture As utilized hereinafter, the term "stable" as applied to the one package alkoxy-terminated organopolysiloxane RTV's of the present invention means a moisture curable mixture capable of remaining substantially unchanged, that is the ability to resist a change in viscosity, while excluded from atmospheric moisture and which cures to a tack-free elastomer after an extended shelf period. In addition, a stable RTV also means that the tack-free time exhibited by freshly mixed RTV ingredients under atmospheric conditions will be substantially the same as that exhibited by the same mixture of ingredients exposed to atmospheric moisture after having been held in a moisture resistant and moisture-free container for an extended shelf period at ambient conditions, or an equivalent period based on accelerated aging at an elevated temperature.

In copending U.S. patent application Ser. No. 277,524, filed June 26, 1981, White et al, for One Package, Stable, Moisture Curable, Polyalkoxy-terminated Organopolysiloxane Compositions and Method for Making, assigned to the same assignee as the present invention, room temperature vulcanizable compositions are shown based on the use of a polyalkoxy terminated polydiorganosiloxane and a silane scavenger for materials having chemically combined hydroxy radicals.

Although valuable, substantially acid-free products have been obtained with the use of such silane scavengers which also can function as stabilizer in the room temperature vulcanizable organopolysiloxane compositions of Ser. No. 277,524, it has been found that the use of such silane scavengers often result in the production of undesirable by-products and disagreeable odors which can interfere with the utility of the RTV composition as it is sometimes difficult to mask its offensive odor. In addition, in view of the special procedures required to synthesize such silane scavengers, and the cost of materials used in such synthesis, the overall cost of the RTV composition can be significantly enhanced.

The present invention is based on my discovery that stable, substantially acid-free one package moisture curable RTV compositions can be made by utilizing a silicon-free scavenger in place of the above-described silane scavenger and more particularly a zeolite Accordingly, these molecular sieves as defined hereinafter, can be advantageously used in combination with the alkoxy-terminated polydiorganosiloxane of the formula,

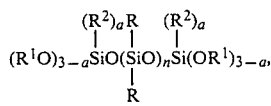

where R and n are as previously defined, $R^1$ is a $C_{(1-8)}$ aliphatic organic radical selected from alkyl radicals, alkylether radicals, alkylester radicals, alkylketone radicals and alkylcyano or a $C_{(7-13)}$ aralkyl radical, $R^2$ is a $C_{(1-13)}$ monovalent organic radical selected from R radicals as previously defined, and a is a whole number equal to 0 to 2 inclusive. It has been found that a stabilizing amount of scavenger for hydroxy radicals in accordance with the practice of the present invention means that there can be used from about 0.1 to about 50 parts of zeolite per 100 parts of the alkoxy-terminated polydiorganosiloxane or the silanol terminated polydiorganosiloxane. Preferably, 1 or 2 parts of scavenger per the 100 parts of organopolysiloxane polymer can be used.

In addition, in certain instances, organic amines can function as curing accelerators in combination with the above described molecular sieves. Furthermore, there can be utilized in the room temperature vulcanizable compositions of the present invention, cross-linking polyalkoxysilane having the formula,

where $R^1$ and $R^2$ are as previously defined, and b is a whole number equal to 0 or 1.

As a result of the substitution of the molecular sieve for the silane scavenger in the above-described White et al U.S. patent application Ser. No. 277,524, the resulting RTV compositions of the present invention can be made at substantially reduced cost and substantially odor free.

STATEMENT OF THE INVENTION

There is provided by the present invention, a one-package, substantially anhydrous, room temperature vulcanizable organopolysiloxane composition stable under ambient conditions in the substantial absence of moisture over an extended period of time and convertible to a substantially acid-free, tack-free elastomer comprising by weight, (A) an organopolysiloxane wherein the silicon atom at each polymer chain end is terminated with at least one alkoxy radical, (B) an effective amount of condensation catalyst (C) from 0 to 0.1 part, per part of the alkoxy terminated organopolysiloxane of (A) of a cross-linking polyalkoxysilane of formula (3)

(D) 0 to 0.1 part, per part of the alkoxy terminated organopolysiloxane of an amine accelerator and (E) a stabilizing amount of a zeolite.

Radicals included within R of formulas (1) and (2) are, for example, aryl radicals and halogenated aryl radicals, such as phenyl, tolyl, chlorophenyl, naphthyl; aliphatic and cycloaliphatic radicals, for example, cyclohexyl, cyclobutyl; alkyl and alkenyl radicals, such as methyl, ethyl, propyl, chloropropyl, vinyl, allyl, trifluoropropyl; and cyanoalkyl radicals, for example, cyanoethyl, cyanopropyl, cyanobutyl. Radicals preferably included within $R^1$ of formulas (2) and (3) are, for example, $C_{(1-8)}$ alkyl radicals, for example, methyl, ethyl, propyl, butyl, pentyl; $C_{(7-13)}$ aralkyl radicals, for example, benzyl; phenethyl; alkylether radicals such as 2-methoxyethyl; alkylester radicals, for example 2-acetoxyethyl; alkylketone radicals, for example 1-butan-3-onyl; alkylcyano radicals, for example 2-cyanoethyl. Radicals included within $R^2$ are the same or different radicals included within R radicals. In formulas (1-3), where R, $R^1$, and $R^2$, can be more than 1 radical, these radicals can be the same or different.

The zeolites which can be utilized in the practice of the present invention are more particularly shown in Reagents for Organic Synthesis, L.F. Fieser and M. Fieser, John Wiley, New York (1967), pages 703–705, Vol. 1. More particularly, molecular sieves are synthetic zeolites of completely regular crystal structure and uniform pore size. Typical molecular sieves which can be utilized are shown by types 3A, 4A, 5A and 13X which are available as powder, 1/16" pellets and 1/8" pellets, or in certain instances available in beads in three sizes. The following shows the compositions of some of these materials.

| Type | Formula | Nominal Pore Diameter |
|------|---------|----------------------|
| 3A | $K_9Na_3[(AlO_2)_{12}(SiO_2)_{12}]\cdot 27H_2O$ | 3A |
| 4A | $Na_{12}[(AlO_2)_{12}(SiO_2)_{12}]\cdot 27H_2O$ | 4A |
| 5A | $Ca_{4.5}Na_3[(AlO_2)_{12}]\cdot 30H_2O$ | 5A |
| 13X | $Na_{86}[(AlO_2)_{86}(SiO_2)_{106}]\cdot xH_2O$ | 10A |

The alkoxy-terminated organopolysiloxane of formula (2), can be made by various procedures. One procedure is taught by Cooper et al U.S. Pat. No. 3,542,901 involving the use of a polyalkoxysilane with a silanol-terminated polydiorganosiloxane in the presence of an amine catalyst. For example, a cross-linking silane of formula (3) can be used in accordance with Cooper et al's method to end-cap a silanol-terminated polydiorganosiloxane of formula (1).

In formulas (1–3), R is preferably selected from $C_{(1-13)}$ monovalent hydrocarbon radicals, halogenated hydrocarbon radicals and cyano alkyl radicals, $R^1$ is preferably a $C_{(1-8)}$ alkyl radical or a $C_{(7-13)}$ aralkyl radical, $R^2$ is preferably methyl, phenyl, or vinyl Some of the cross-linking polyalkoxysilanes included within formula (3) are, for example, methyltrimethoxysilane; methyltriethoxysilane; ethyltrimethoxysilane; tetraethoxysilane; vinyltrimethoxysilane; etc.

Among the amine accelerators which can be used to accelerate the cure of the RTV composition of the present invention there are included silyl substituted guanidines having the formula,

$$(Z)_g Si(OR^1)_{4-g}, \quad (4)$$

where $R^1$ is as previously defined, Z is a guanidine radical of the formula,

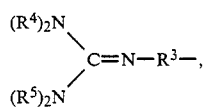

$R^3$ is divalent $C_{(2-8)}$ alkylene radical, $R^4$ and $R^5$ are selected from hydrogen and $C_{(1-8)}$ alkyl radicals and g is an integer equal to 1 to 3 inclusive. In addition, alkyl substituted guanidines having the formula,

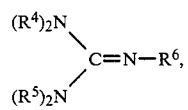

where $R^4$ and $R^5$ are as previously defined and $R^6$ is a $C_{(1-8)}$ alkyl radical, also can be employed. Some of the silyl substituted guanidines included within formula (8) are shown by Takago U.S. Pat. Nos. 4,180,642 and 4,248,993.

In addition to the above described amine accelerators, additional nitrogen bases which can be used as accelerators in combination with the above-described synthetic zeolites are for example, compounds containing amidine, amine oxide, aminopyridine, azo, azomethine, azoxy, cyanate, hydrazide, hydrazine, hydrazone, imine, isocyanate, isothiocyanate, oxazone, nitroso, thiocyan-ate, thiourea, urea, and urethane functionalities and nitrogen containing heterocyclics such as imidazoles, imidazolines, isoxazoles, lactams, oxazoles, purines, pyrazines, pyrazoles, pyrazolines, pyrimidines, pyrroles and thiazoles.

In addition to the above substituted guanidines, there can be used various amines, for example, di-n-hexylamine, dicyclohexylamine, di-n-octylamine, hexamethoxymethylmelamine, and silylated amines, for example, γ-aminopropyltrimethoxysilane and methyldimethoxy-di-n-hexylaminosilane. Methyldimethoxy-di-n-hexylaminosilane acts as both a scavenger and curing accelerator. The primary amines, secondary amines, silylated secondary amines are preferred, and secondary amines, and silylated secondary amines are particularly preferred. Silylated secondary amines such as alkyldialkoxy-n-dialkylaminosilanes and guanidines such as alkyldialkoxyalkylguanidylsilanes which are useful as cure accelerators herein also act as scavengers and, in certain instances, as stabilizers in the compositions of this invention.

As previously described the alkoxy terminated organopolysiloxane of formula (2) can be made by using a polyalkoxysilane with a silanol-terminated polydiorganosiloxane. The silanol-terminated polydiorganosiloxanes which can be used to make the polyalkoxyorganopolysiloxanes are well known and preferably have a viscosity in the range of from about 100 to about 400,000 centipoise and more preferred from about 1000 to about 250,000 centipoise when measured at about 25° C. These silanolterminated fluids can be made by treating a higher molecular weight organopolysiloxane, such as dimethylpolysiloxane with water in the presence of a mineral acid, or base catalyst, to tailor the viscosity of the polymer to the desired range. Methods for making such higher molecular weight organopolysiloxane utilized in the production of silanol-terminated polydiorganosiloxane of formula (1), are well known. For example, hydrolysis of a diorganohalosilane such as dimethyldichlorosilane, diphenyldichlorosilane, methylvinyldichlorosilane, or mixtures thereof, can provide for the production of low molecular weight hydrolyzate. Equilibration thereafter can provide for higher molecular weight organopolysiloxane. Equilibration of cyclopolysiloxane such as octamethylcyclotetrasiloxane, octaphenylcyclotetrasiloxane, or mixtures thereof, will also provide for higher molecular weight polymers. Preferably, such polymers are decatalyzed of equilibration catalyst by standard procedures prior to use, such as shown by Boot U.S. Pat. No. 3,153,007, assigned to the same assignee as the present invention.

Silanol-terminated organopolysiloxanes having viscosities below 1200 centipoises can be made by treating organopolysiloxanes consisting essentially of chemically combined diorganosiloxy units with steam under pressure. Other methods that can be employed to make silanol-terminated polydiorganosiloxanes are more particularly described in U.S. Pat. No. 2,607,792 to Warrick and U.K. Pat. No. 835,790.

Effective amounts of the condensation catalysts which can be used in the practice of the present invention to facilitate the cure of the RTV compositions are, for example, 0.001 to 1 part based on the weight of 100 parts of the silanol-terminated polydiorganosiloxane of formula (1). There are included tin compounds, for example, dibutyltindilaurate; dibutyltindiacetate; dibutyltindimethoxide; carbomethoxyphenyl tin tris-uberate; tin octoate; isobutyl tin triceroate; dimethyl tin dibutyrate; dimethyl tin di-neodeconoate; triethyl tin tartrate; dibutyl tin dibenzoate; tin oleate; tin naphthenate; butyltintri-2-ethylhexoate; tinbutyrate. The preferred condensation catalysts are tin compounds and dibutyltindiacetate is particularly preferred.

Titanium compounds which can be used are, for example, 1,3-propanedioxytitanium bis(ethylacetoacetate); 1,3-propanedioxytitanium bis(acetylacetonate); diisopropoxytitanium bis(acetylacetonate); titanium naphthenate; tetrabutyltitanate; tetra-2-ethylhexyltitanate; tetraphenyltitanate; tetraoctadecyltitanate; ethyltriethanolaminetitanate. In addition betadecarbonytitanium compounds as shown by Weyenberg U.S. Pat. No. 3,334,067 can be used as condensation catalysts in the present invention.

Zirconium compounds, for example, zirconium octoate, also can be used.

Further examples of metal condensation catalysts are, for example, lead 2-ethyloctoate; iron 2-ethylhexoate; cobalt 2-ethylhexoate; manganese 2-ethylhexoate; zinc 2-ethylhexoate; antimony octoate; bismuth naphthenate; zinc naphthenate; zinc stearate;.

Examples of nonmetal condensation catalysts are hexylammonium acetate and benzyltrimethylammonium acetate.

Various fillers and pigments can be incorporated in the silanol or alkoxy-terminated organopolysiloxane, such as for example, titanium dioxide, zirconium silicate, silica aerogel, iron oxide, diatomaceous earth, fumed silica, carbon black, precipitated silica, glass fibers, polyvinyl chloride, ground quartz, calcium carbonate etc. The amounts of filler used can obviously be varied within wide limits in accordance with the intended use. For example, in some sealant applications, the curable compositions of the present invention can be used free of filler. In other applications, such as the employment of the curable compositions for making binding material on a weight basis, as much as 700 parts or more of filler, per 100 parts of organopolysiloxane can be employed. In such applications, the filler can consist of a major amount of extending materials, such as ground quartz, polyvinylchloride, or mixtures thereof, preferably having an average particle size in the range of from about 1 to 10 microns.

The compositions of the present invention also can be employed as construction sealants and caulking compounds. The exact amount of filler, therefore, will depend upon such factors as the application for which the organopolysiloxane composition is intended, the type of filler utilized (that is, the density of the filler and its particle size). Preferably, a proportion of from 10 to 300 parts of filler, which can include up to about 35 parts of a reinforcing filler, such as fumed silica filler, per 100 parts of silanol-terminated organopolysiloxane is utilized.

In the practice of the invention the room temperature vulcanizable compositions can be made by agitating, for example stirring, a mixture of materials which can consist of a polyalkoxy terminated diorganopolysiloxane, molecular sieve, cross-linking silane of formula (3) which can be optional, and amine accelerator, where the blending is performed in a substantial absence of atmospheric moisture. Thereafter, the condensation catalyst is added also in the substantial absence of atmospheric moisture.

As used hereinafter, the expressions "moisture-free conditions" and "substantially anhydrous conditions", with reference to making the RTV compositions of the present invention, mean mixing in a dry box, or in a closed container which has been subjected to vacuum to remove air, which thereafter is replaced with a dry inert gas, such as nitrogen. Temperatures can vary from about 0° C. to about 180° C. depending upon the degree of blending, the type and amount of filler.

A preferred procedure for making the RTV compositions of the present invention is to agitate under substantially anhydrous conditions, a mixture of the polyalkoxy terminated organopolysiloxane, filler, along with an amount of polyalkoxysilane of formula (3) sufficient to effect the substantial elimination of hydroxy functional groups in the mixture. This "end-capping" procedure can require several minutes, hours, or even days, depending upon such factors as the amount of silanol on the filler, the nature of the $OR^1$ radical on the cross-linking silane, etc. There then can be added to the substantially silanol-free mixture the condensation catalyst, cross-linking silane or mixture thereof, along with other ingredients, for example, the curing accelerator and pigments.

In order that those skilled in the art will be better able to practice the invention, the following examples are given by way of illustration and not by way of limitation. All parts are by weight.

Example 1

Room temperature vulcanizable organopolysiloxane compositions were prepared by mixing together under substantially anhydrous conditions, methyldimethoxy end-capped polydimethylsiloxane having a viscosity of about 2500–3500 centipoise at 25° C., dibutyltindiacetate and di-n-hexylamine. Additional room temperature vulcanizable compositions were prepared following the same procedure, except that in place of the methyldimethoxy end-capped polydimethylsiloxane, there was used a mixture of 62 parts of the methyldimethoxy end-capped polydimethylsiloxane and 38 parts of a trimethylsiloxy end-capped polydimethylsiloxane oil. There also was used a silanol terminated dimethylpolysiloxane.

There was added to some of the above RTV formulations, powdered 4A sieves, while to other RTV formulations there was added along with the 4A sieves, methanol, or methyltrimethoxysilane, or a mixture of methanol and methyltrimethoxysilane.

The stability of the various RTV formulations was then evaluated by measuring their tack-free times or change in physical state or viscosity as the result of heat aging at temperatures of from 25° C. to 100° C. over a period of from about 9 hours to 72 hours. The following results were obtained, where "Hydroxy-Silicone" is the silanol terminated dimethylpolysiloxane, "Methyldimethoxy-Silicone" is the methyldimethoxy end-capped dimethylpolysiloxane, "Silicone Oil" is the trimethylsiloxy end-capped polydimethylsiloxane, "TFT" is tack-free time and "Q$_2$NH" is di-N-hexylamine:

| Formulation | Parts | Sample History | TFT, (in min) No Sieves | TFT, (in min) Sieves | Physical State After Heat Aging (Before Cure) |
|---|---|---|---|---|---|
| methyldimethoxy silicone | 100 | no heating | 50 | 50 | Composition without sieves partially gelled; composition with sieves remained fluid. |
| Bu₂Sn(OAc)₂ | 0.2 | | | | |
| Q₂NH | 0.5 | 38° C. 48 hr | 50 | 50 | |
| 4A sieves | 0.8 | 38° C. | | | |
| methyl dimethoxy-silicone | 100 | | | | Without sieves, formulation turned into a rubber; with sieves, no change in viscosity of formulation. |
| Bu₂Sn(OAc)₂ | 0.3 | no heating | 35 | 40 | |
| Q₂NH | 0.5 | | | | |
| CH₃OH | 0.2 | 38° C. 66 hr | — | 50 | |
| 4A sieves | 1.2 | | | | |
| hydroxy-silicone | 100 | | | | Without sieves, formulation became very viscous; with sieves, no change in viscosity. |
| MeSi(OMe)₃ | 2 | 25° C.; 9 hr | 30 | 45 | |
| Bu₂Sn(OAc)₂ | 0.3 | 25° C.; 72 hr | 70 | 100 | |
| Q₂NH | 0.5 | 38° C.; 48 hr | 110 | 110 | |
| 4A sieves | 1.2 | | | | |
| Same hydroxy-silicon formulation with 0.2 part of CH₃OH | | 38° C., 48 hr | 100 | 120 | Without sieves, formulation became very viscous; with sieves, no change in viscosity. |
| methyldimethoxy-silicone | 68 | no heating | 42 | 42 | |
| Silicone Oil | 32 | | | | |
| Q₂NH | 0.4 | | | | |
| Bu₂Sn(OAc)₂ | 0.12 | | | | |
| 4A Sieves | 1.3 | 100° C. 21 hr | no cure | 66 | |
| 4A Sieves | | 100° C. 48 hr | no cure | no cure | |

Q₂NH = di-n-hexylamine

The above results show that the 4A sieves serve as a valuable scavenger for methanol during the cure of the RTV compositions.

Although the above Examples are directed to only a few of the very many compositions which are included in the scope of the present invention, it should be understood that the present invention is directed to a much broader variety of room temperature vulcanizable compositions and method for making, based on the use of alkoxy-terminated polydiorganosiloxane of formula (2), or silanol terminated polydiorganosiloxane of formula (1) in combination with organopolyalkoxysilane of formula (3) with molecular sieve, condensation catalyst and amine accelerator as shown in the description preceding these examples. In instances where silanol terminated polydiorganosiloxane is used to make RTV compositions, there can be used from 0.001 to 0.1 part of cross-linking polyalkoxysilane of formula (3), per part of the silanol terminated polydiorganosiloxane.

What I claim as new and desire to secure by Letters Patent of the United States is:

1. A one-package, substantially anhydrous, room temperature vulcanizable organopolysiloxane composition stable under ambient conditions in the substantial absence of moisture over an extended period of time and convertible to a substantially acid-free, tack-free elastomer comprising,
    (A) an organopolysiloxane wherein the silicon atom at each polymer chain end is terminated with at least one alkoxy radical,
    (B) an effective amount of condensation catalyst
    (C) from 0 to 0.1 part, per part of the alkoxy terminated organopolysiloxane of (A) of a cross-linking polyalkoxysilane
    (D) 0 to 0.1 part, per part of the alkoxy terminated organopolysiloxane of an amine accelerator and
    (E) a stabilizing amount of a zeolite.

2. A room temperature vulcanizable composition in accordance with claim 1, where the alkoxy-terminated polydiorganosiloxane is a methyldimethoxy terminated polydimethylsiloxane.

3. A room temperature vulcanizable composition in accordance with claim 1, where the condensation catalyst is a tin compound.

4. A room temperature vulcanizable composition in accordance with claim 1, where the zeolite is a synthetic molecular sieve.

5. A room temperature vulcanizable composition in accordance with claim 1, where the amine accelerator is di-n-hexylamine.

6. A method for making a room temperature vulcanizable composition which comprises agitating under substantially anhydrous conditions at a temperature in the range of from 0° C. to 180° C. a mixture comprising
    (A) an organopolysiloxane wherein the silicon atom at each polymer chain end is terminated with at least one alkoxy radical,
    (B) a stabilizing amount of a zeolite
    (C) 0 to 0.1 part, per part of the alkoxy terminated organopolysiloxane of (A) of a cross-linking silane of the formula

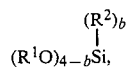

(D) an effective amount of a condensation catalyst and (E) 0 to 0.1 part, per part of the alkoxy terminated organopolysiloxane of (A) of a curing accelerator selected from the group consisting of substituted guanidine, amines and mixtures thereof, where $R^1$ is a $C_{(1-8)}$ aliphatic organic radical selected from alkyl radicals, alkylether radicals, alkylester radicals, alkylketone radicals and alkylcyano or a $C_{(7-13)}$ aralkyl radical, $R^2$ is a $C_{(1-13)}$ monovalent organic radical and b is a whole number equal to 0 or 1.

7. A method in accordance with claim 6, where the zeolite is a synthetic molecular sieve.

8. A method for making a room temperature vulcanizable composition which comprises agitating under substantially anhydrous conditions at a temperature in the range of from 0° C. to 180° C. a mixture of ingredients comprising by weight (A) a silanol terminated polydiorganosiloxane (B) an effective amount of a condensation catalyst (C) 0.001 to 0.1 part per part of the silanol terminated polydiorganosiloxane of a cross-linking polyalkoxysilane (D) from 0 to 0.1 part per part of the silanol terminated polydiorganosiloxane of an amine accelerator (E) a stabilizing amount of a zeolite.

* * * * *